United States Patent [19]
Masuda et al.

[11] Patent Number: 5,965,869
[45] Date of Patent: Oct. 12, 1999

[54] METHOD OF LEADING IN APC CONTROL AND IMAGE FORMING APPARATUS USING THE SAME

[75] Inventors: Michiharu Masuda; Takayuki Kawakami, both of Numazu, Japan

[73] Assignee: Canon Kabushiki Kaisha, Tokyo, Japan

[21] Appl. No.: 08/990,914

[22] Filed: Dec. 15, 1997

[30] Foreign Application Priority Data

Dec. 13, 1996 [JP] Japan .................................... 8-333633

[51] Int. Cl.$^6$ ..................................................... G01J 1/32
[52] U.S. Cl. ......................... 250/205; 250/234; 359/204; 347/236
[58] Field of Search .................................. 250/205, 234, 250/236; 359/204; 347/235, 236, 246

[56] References Cited

U.S. PATENT DOCUMENTS 5,834,766  11/1998  Suhara ..................................... 250/234

Primary Examiner—Que T. Le
Attorney, Agent, or Firm—Fitzpatrick, Cella, Harper & Scinto

[57] ABSTRACT

In an APC control lead-in method in an image forming apparatus having a plurality of laser light sources, a laser beam emitted by at least one of the plurality of laser light sources is scanned by a deflector to detect a synchronization signal from the scanned laser beam. A first laser light source as one of the plurality of laser light sources is turned on to be led in APC control of the first laser light source. A second laser light source as the remaining one of the plurality of laser light sources is turned on in synchronism with the synchronization signal after lead-in of the APC control of the first laser light source is complete so as to be led in APC control of the second laser light source.

5 Claims, 4 Drawing Sheets

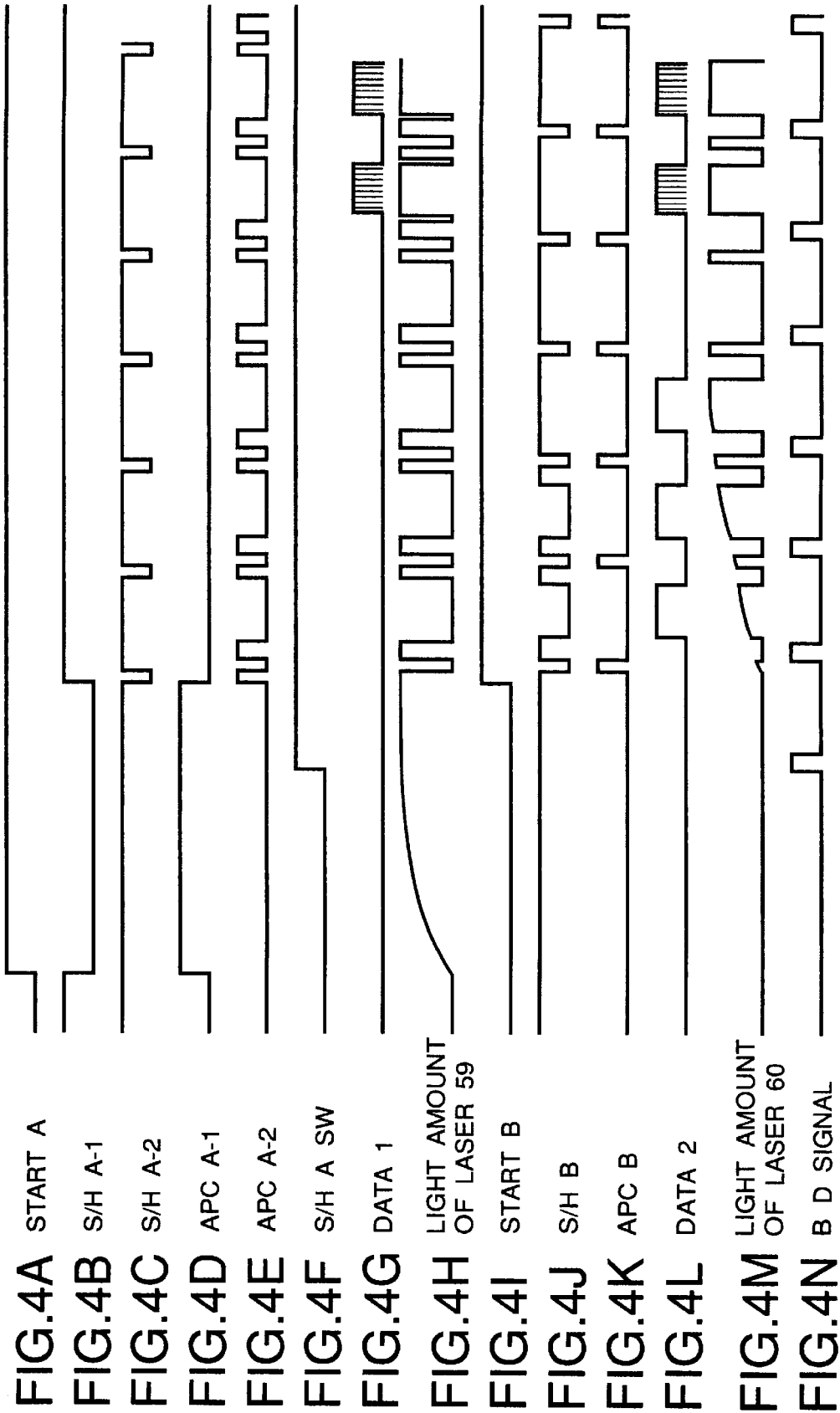

METHOD OF LEADING IN APC CONTROL AND IMAGE FORMING APPARATUS USING THE SAME

BACKGROUND OF THE INVENTION

1. Field of the Invention

The present invention relates to a method of leading in APC control for a multibeam optical write method which makes an optical write on an image carrier using a plurality of light beams, and an image forming apparatus using the same.

2. Related Background Art

In general, an image forming apparatus such as a printer, copying machine, facsimile apparatus, or the like makes an optical write on a photosensitive drum using a laser chip that integrates a single semiconductor laser and a single photodiode. More specifically, the semiconductor laser is driven in accordance with an image signal, and a laser beam modulated in correspondence with the image signal is linearly scanned on the photosensitive drum via a polygonal mirror, thereby making an optical write on the photosensitive drum. The photodiode detects some light components of the laser beam emitted by the semiconductor laser, and the detection signal is fed back to control the light amount of the semiconductor laser to a predetermined amount. This control will be referred to as APC control hereinafter.

In such an image forming apparatus, in order to turn on the OFF semiconductor laser and to start its APC control (to lead in the APC control) to print, a drive current is supplied to the semiconductor laser to set it continuously ON while the polygonal mirror is rotating. The light reflected by the polygonal mirror is detected by a sensor, and when a synchronization signal is detected from the output signal of the sensor, the APC control is led in synchronously with the synchronization signal, thus starting the APC control.

In the conventional technique, when an optical write is done in units of lines using a single semiconductor laser, the APC control can be easily led in, as described above. However, when optical writes are simultaneously done on a photosensitive drum by a plurality of laser beams using a plurality of semiconductor lasers, since only one photodiode is equipped in correspondence with the plurality of semiconductor lasers, it is difficult to attain the APC control of the individual semiconductor lasers by simultaneously turning on these semiconductor lasers. For this reason, it is hard to directly use the conventional APC control lead-in method for a single semiconductor laser in a multibeam write apparatus using a plurality of semiconductor lasers, and a new APC control lead-in method for a multibeam optical write is demanded.

SUMMARY OF THE INVENTION

It is an object of the present invention to provide an APC control lead-in method, which can reliably lead in the APC control in a multibeam write that makes an optical write using a plurality of light beams, and an image forming apparatus using the method.

The object of the present invention is achieved by an APC control lead-in method comprising the step of scanning a laser beam emitted by at least one of the plurality of laser light sources by a deflector, and detecting a synchronization signal from the scanned laser beam, the step of turning on a first laser light source as one of the plurality of laser light sources and leading in APC control of the first laser light source, and the step of turning on a second laser light source as the remaining one of the plurality of laser light sources in synchronism with the synchronization signal after lead-in of the APC control of the first laser light source is complete, and leading in APC control of the second laser light source.

Also, the object of the present invention is achieved by a method of leading in APC control of a plurality of laser light sources, used when an apparatus, which comprises a plurality of laser light sources for writing an image signal, and a single detection element for detecting laser beams emitted by the laser light sources, time-divisionally turns on the plurality of light sources in a non-image region, and passes its control to APC control for controlling the light amount of the individual laser light sources to desired light amounts on the basis of an output signal from the detection element, comprising the step of turning on one of the plurality of light sources to lead in the APC control of the ON laser light source, the step of scanning a laser beam from at least one of the plurality of laser light sources by a deflector and detecting a synchronization signal from the scanned reflected light, and the step of turning on one of the remaining light sources in synchronism with the synchronization signal when the synchronization signal is detected from the reflected light from the deflector, and leading in the APC control of the ON laser light source.

The object of the present invention is achieved by an image forming apparatus which comprises a plurality of laser light sources for writing an image signal, and a single detection element for detecting laser beams emitted by the individual laser light sources, time-divisionally turns on the plurality of laser light sources in a non-image region, and controls the light amounts of the laser light sources to desired light amounts on the basis of an output signal from the detection element, comprising means for turning on one of the plurality of light sources to lead in the APC control of the ON laser light source, detection means for scanning a laser beam from at least one of the plurality of laser light sources by a deflector and detecting a synchronization signal from the scanned reflected light, and means for, when the synchronization signal is detected from the reflected light from the deflector, turning on one of the remaining light sources in synchronism with the synchronization signal, and leading in the APC control of the ON laser light source.

It is another object of the present invention to provide an optical write method which can attain a stable multibeam write by reliably executing APC control of a plurality of laser light sources in a multibeam write that makes an optical write using a plurality of light beams, and an image forming apparatus using the method.

The object of the present invention is achieved by an optical write method comprising the step of scanning a laser beam emitted by at least one of the plurality of laser light sources by a deflector, and detecting a synchronization signal from the scanned laser beam, the step of scanning a laser beam emitted by at least one of the plurality of laser light sources by the deflector and making an optical write on an image carrier, the step of turning on a first laser light source as one of the plurality of laser light sources during a period in which neither detection of the synchronization signal nor optical write are in progress, and performing APC control of the first laser light source, and the step of turning on a second laser light source as the remaining one of the plurality of laser light sources after the APC control of the first laser light source is performed during the period in which neither detection of the synchronization signal nor optical write are in progress, and performing APC control of the second laser light source.

The object of the present invention is achieved by an image forming apparatus which drives a plurality of laser light sources in accordance with an image signal, and makes an optical write on a photosensitive drum by scanning a plurality of laser beams modulated in correspondence with the image signal on the photosensitive drum using a deflector, wherein a first laser light source as one of the plurality of laser light sources is turned on during a period in which neither detection of a synchronization signal from a laser beam scanned by the deflector nor optical write onto the photosensitive drum are in progress, so as to execute APC control of the first light source, and after the APC control of the first laser light source is done during the period in which neither detection of a synchronization signal from a laser beam scanned by the deflector nor optical write onto the photosensitive drum are in progress, a second laser light source as one of the remaining laser light sources is turned on to execute APC control of the second laser light source.

The object of the present invention is achieved by an optical write method comprising the step of scanning a laser beam emitted by at least one of the plurality of laser light sources by a deflector, and detecting a synchronization signal from the scanned laser beam, the step of scanning a laser beam emitted by at least one of the plurality of laser light sources by the deflector and making an optical write on an image carrier, the step of turning on a first laser light source as one of the plurality of laser light sources in synchronism with the synchronization signal, and performing APC control of the first laser light source, and the step of turning on a second laser light source as the remaining one of the plurality of laser light sources in synchronism with the synchronization signal after the APC control of the first laser light source is performed, and performing APC control of the second laser light source.

The object of the present invention is achieved by an image forming apparatus which drives a plurality of laser light sources in accordance with an image signal, and makes an optical write on a photosensitive drum by scanning a plurality of laser beams modulated in correspondence with the image signal on the photosensitive drum using a deflector, wherein a synchronization signal is detected from the laser beam scanned by the deflector, a first light source as one of the plurality of laser light sources is turned on in synchronism with the synchronization signal so as to execute APC control of the first laser light source, and after the APC control of the first laser light source is done, a second light source as one of the remaining laser light sources is turned on in synchronism with the synchronization signal to execute the APC control of the second laser light source.

BRIEF DESCRIPTION OF THE DRAWINGS

FIGS. 4A, 4B, 4C, 4D, 4E, 4F, 4G, 4H, 4I, 4J, 4K, 4L, 4M and 4N are timing charts for explaining the operation of the control unit shown in FIG. 3.

DETAILED DESCRIPTION OF THE PREFERRED EMBODIMENTS

Figure 1:
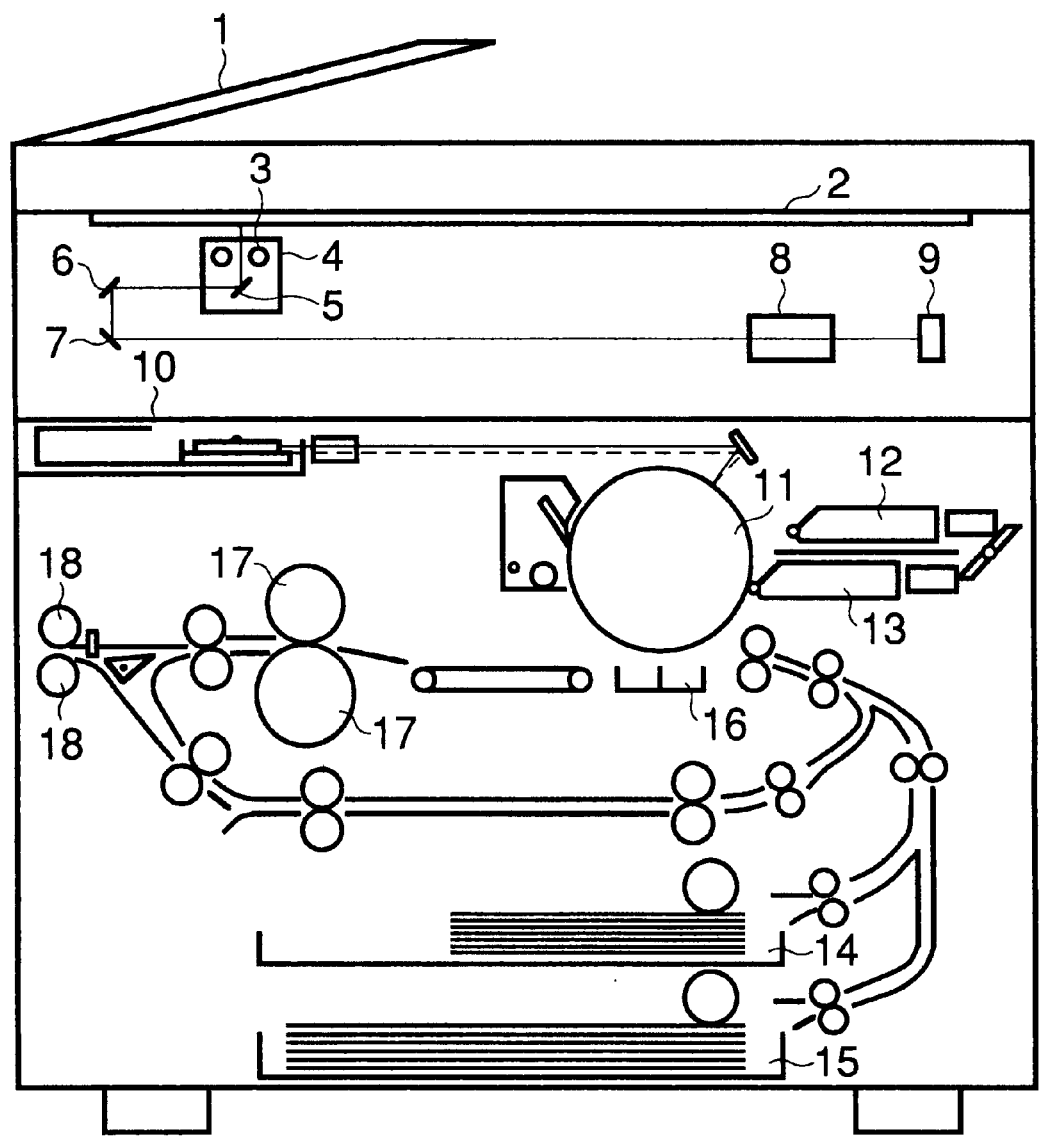
FIG. 1 is a sectional view showing the arrangement of an image forming apparatus according to an embodiment of the present invention.

An embodiment of the present invention will be described below with reference to the accompanying drawings. FIG. 1 is a sectional view showing the arrangement of an image forming apparatus according to an embodiment of the present invention. In FIG. 1, a document feeder feeds originals set thereon one by one onto a platen 2. When an original is set on the platen 2, a scanner unit 4 moves in the horizontal direction, and a lamp 3 illuminates the original. Light reflected by the original is guided to an image sensor unit 9 via mirrors 5, 6, and 7, and an image on the original is read by the image sensor unit 9. An image signal read by the image sensor unit 9 is supplied to an exposure control unit 10 directly or after it is temporarily stored in an image memory (not shown) and is read out again.

The exposure control unit 10 has two, first and second, semiconductor lasers, as will be described in detail later, and forms a latent image on a photosensitive drum 11 by driving the individual semiconductor lasers in accordance with an image signal, and simultaneously linearly scanning two laser beams modulated in correspondence with the image signal. The exposure control unit 10 repeats such operation to form a latent image for one page on the photosensitive drum 11 as an image carrier. The latent image formed on the photosensitive drum 11 is developed with toner by a developer 12 or 13. On the other hand, a transfer paper sheet having a desired size is fed from a paper feed cassette 14 or 15 in synchronism with the formation of the latent image, and the developed toner image is transferred onto the transfer paper sheet by a transfer device 16. The transfer paper sheet on which the toner image has been transferred is fed to a fixing device 17, and the toner image is fixed. Then, the paper sheet is discharged outside the apparatus by discharge rollers 18.

Figure 2:
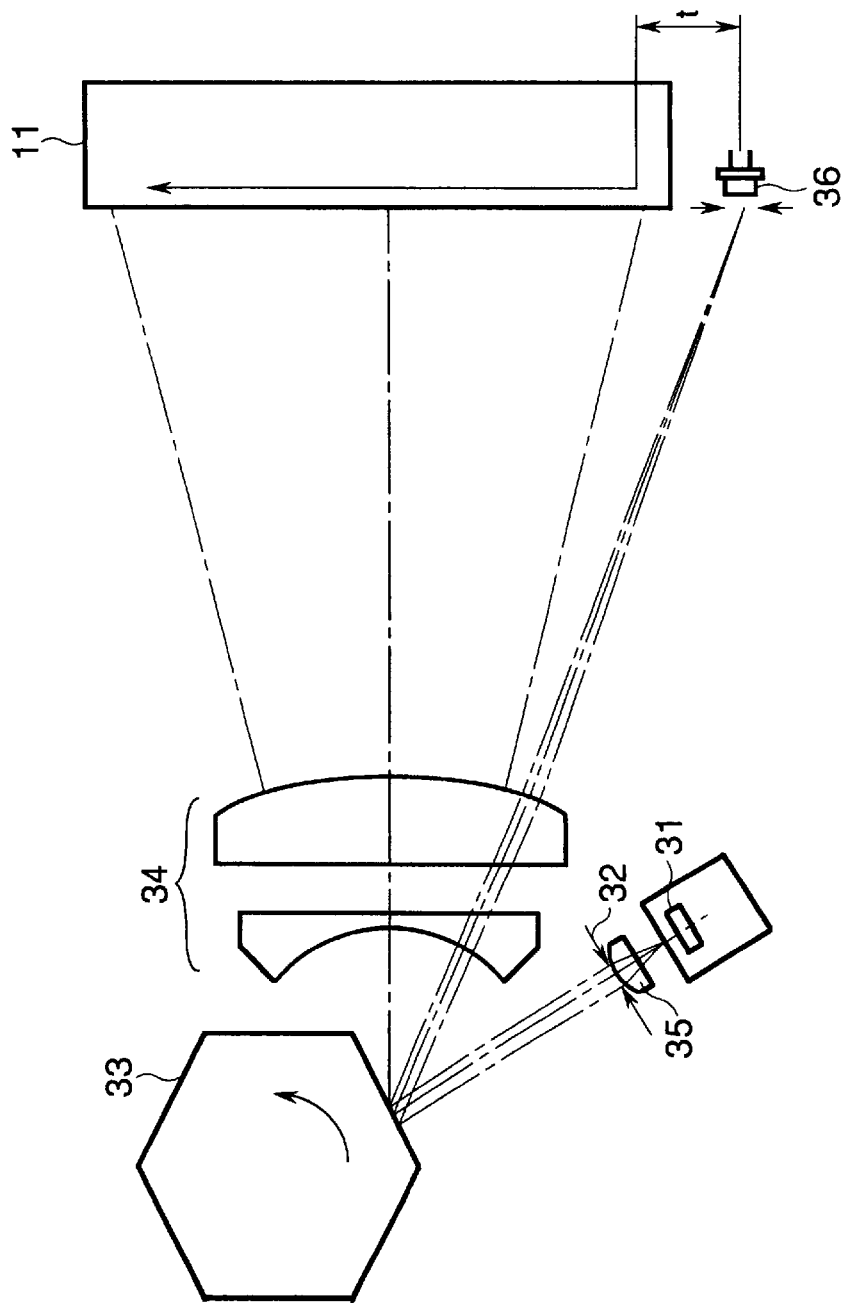
FIG. 2 is a plan view showing an exposure control unit of the embodiment shown in FIG. 1 in detail.

FIG. 2 shows the arrangement of the exposure control unit 10. In FIG. 2, a twin laser 31 has two semiconductor lasers. The twin laser 31 includes a single photodiode for detecting some light components of laser beams emitted by the individual semiconductor lasers, and APC control of laser diodes is done using a detection signal of the photodiode. Laser beams emitted by the twin laser 31 are converted into nearly collimated light beams by a collimator lens 35 and a stop 32, and are incident on a rotary polygonal mirror 33 with a predetermined beam size.

The rotary polygonal mirror 33 rotates at constant angular velocity in the direction of an arrow, and the laser beams coming from the twin laser 31 are reflected as deflected beams that continuously change their angles upon rotation of the mirror 33. The reflected laser beams are focused by an f-θ lens 34. At the same time, since the f-θ lens 34 corrects distortion to guarantee temporal linearity of scanning, the laser beams reflected by the rotary polygonal mirror 33 are scanned on the photosensitive drum 11 at constant velocity in the direction of an arrow. Note that a BD (beam detect) sensor 36 detects light reflected by the rotary polygonal mirror 33. The detection signal of the BD sensor 36 is used as a synchronization signal (BD signal) for synchronizing the rotation of the rotary polygonal mirror 33 and the data write.

Figure 3:
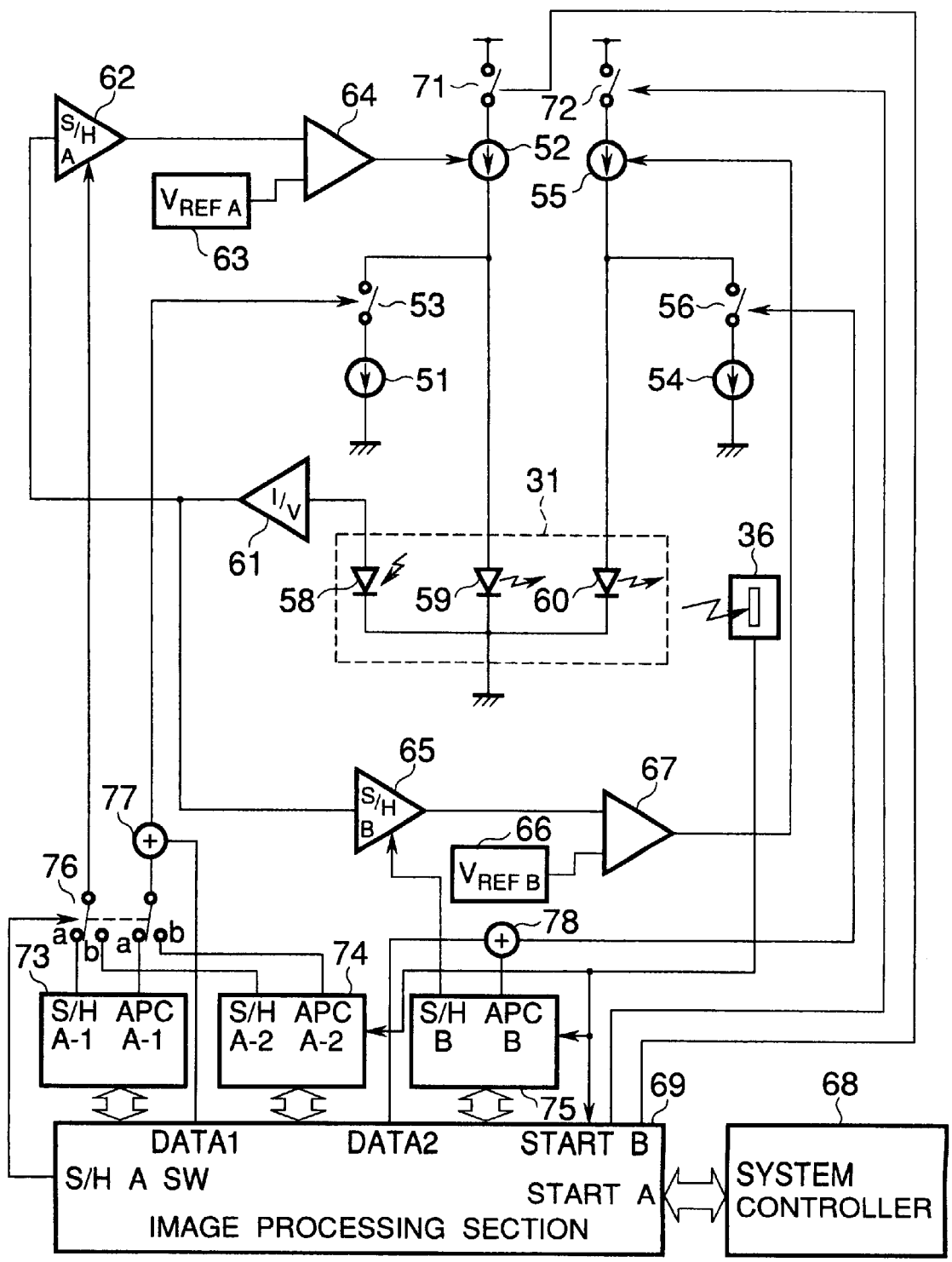
FIG. 3 is a circuit diagram showing the arrangement of a control unit for controlling a twin laser of the embodiment shown in FIG. 1.

FIG. 3 is a block diagram showing the arrangement of a control circuit for controlling the twin laser of this embodiment. In FIG. 3, a system controller 68 controls the individual units of the apparatus shown in FIG. 1, and an image processing system 69 processes an image signal read by the image sensor unit 9 in FIG. 1. The image processing system 69 supplies an image signal from the image sensor unit 9 in units of two lines in synchronism with a BD signal (to be described later), or executes control for leading in APC control of the two semiconductor lasers, as will be described in detail later. Control signal generators 73 to 75 generate timing signals required for leading in APC control of the two semiconductor lasers, and a switch 76 selects one of the signals from the control signal generators 73 and 74. The twin laser 31 (FIG. 2) comprises semiconductor lasers 59 and 60, and a photodiode 58 for detecting some light components of laser beams from these semiconductor lasers. The BD sensor 36 (FIG. 2) is used for detecting a synchronization signal.

A bias current source 51 and pulse current source 52 are used for controlling the semiconductor laser 59, and a switch 53 is turned on/off in response to an image signal. A switch circuit 71 is turned on under the control of the image processing system 69 when the semiconductor laser 59 is driven. The switch circuit 71 includes a slow start circuit (not shown) for preventing inrush currents produced upon power ON. Note that upon receiving a high-level signal, the switch 53 is turned off and the semiconductor laser 59 is turned on by pulse currents supplied from the pulse current source 52. On the other hand, upon receiving a low-level signal, the switch 53 is turned on and at that time, the semiconductor laser 59 is turned off since the pulse currents from the pulse current source 52 are supplied to the bias current source 51. In this manner, by controlling the switch 53 in accordance with the image signal, the semiconductor laser 59 is driven to make an optical write on the photosensitive drum 11.

During normal APC control after the APC control is led in, as will be described later, the switch 53 is turned off in a non-image region to turn on the semiconductor laser 59. In synchronism with this operation, a sample/hold circuit 62 samples. At this time, some light components of a laser beam emitted by the semiconductor laser 59 are detected by the photodiode 58, and the detection signal is converted into a voltage signal by a current/voltage converter 61. The output signal from the current/voltage converter 61 is sampled by the sample/hold circuit 62, and is then supplied to an operational amplifier 64.

The operational amplifier 64 compares the output signal from the sample/hold circuit 62 with a reference voltage generated by a reference voltage generator 63, and controls the currents of the pulse current source 52 in accordance with their difference signal. More specifically, APC control is done by controlling the currents of the pulse current source 52 to have a target light amount set as the reference voltage by the reference voltage generator 63, so that the light amount of the semiconductor laser 59 becomes a desired light amount. On the other hand, in an image region, the output signal from the current/voltage converter 61 in the non-image region is held by the sample/hold circuit 62, and the operation amplifier 64 controls the light amount of the semiconductor laser 59 with reference to the held signal and the reference voltage.

A pulse current source 55 and bias current source 54 are used for driving the other semiconductor laser 60, and a switch 56 is turned on/off in response to an image signal. A switch circuit 72 is turned on under the control of the image processing system 69 when the semiconductor laser 60 is driven, and includes a slow start circuit as in the switch circuit 71. The switch 56 is turned off in response to a high-level signal and is turned on in response to a low-level signal, as in the switch 53, and drive currents are supplied to the semiconductor laser 60 in accordance with operation of the switch 53.

During normal APC control after the APC control is led in, as will be described later, the semiconductor laser 60 is turned on in a non-image region as in the semiconductor laser 59, and some light components of a laser beam at that time are detected by the photodiode 58. The output signal from the photodiode 58 is converted into a voltage signal by the current/voltage converter 61, and the voltage signal is supplied to a sample/hold circuit 65. An operational amplifier 67 controls the currents of the pulse current source 55 in accordance with the comparison result between the output signal from the sample/hold circuit 65, and a reference voltage generated by a reference voltage generator 66. More specifically, APC control is done by controlling the currents of the pulse current source 55 to have a target light amount given as the reference voltage from the reference voltage generator 66, so that the light amount of the semiconductor laser 60 has a desired light amount. On the other hand, in an image region, the output signal from the current/voltage converter 61 is similarly held by the sample/hold circuit 65, and the semiconductor laser is controlled by comparing the held signal and the reference voltage.

An APC control lead-in method of this embodiment will be described below with reference to FIGS. 4A to 4N. When the system controller 68 outputs a signal for directing printing, the image processing system 69 sets a signal STARTA at high level to turn on the switch circuit 71, as shown in FIG. 4A. At the same time, the image processing system 69 outputs a signal S/HASW shown in FIG. 4F to the switch 76 to respectively connect two contacts of the switch 76 to the a sides. In this way, a signal S/HA-1 (sample low level) from the control signal generator 73 is supplied to the sample/hold circuit 62, and a signal APCA-1 is supplied to the switch 53 via an adder 77. FIG. 4B shows the signal S/HA-1 and FIG. 4D shows the signal APCA-1. The signal S/HA-1 is a low-level signal, as shown in FIG. 4B, and the sample/hold circuit 62 samples when the signal S/HA-1 is at low level. The signal APCA-1 is a high-level signal, as shown in FIG. 4D, and the switch 53 is turned off. Since no DATAL is output, as shown in FIG. 4G, the adder 77 supplies the signal APCA-1 alone to the switch 53.

When the switch circuit 71 is ON, the switch 53 is OFF, and the sample/hold circuit 62 is sampling in this way, the pulse current source 52 supplies drive currents to the semiconductor laser 59. At this time, the laser beam emitted by the semiconductor laser 59 is detected by the photodiode 58, and the detection signal is converted into a voltage signal by the current/voltage converter 61. The voltage signal is fed back to the operational amplifier 64 via the sample/hold circuit 65. Since the sample/hold circuit 65 samples for a predetermined period, as shown in FIG. 4B, the semiconductor laser 59 is kept ON, and its light amount is controlled to a target value set based on the reference voltage. FIG. 4H shows the light amount of the semiconductor laser 59. The light amount of the semiconductor laser 59 gradually increases, as shown in FIG. 4H, since the switch circuit 71 has a slow start circuit, as described earlier.

Meanwhile, the rotary polygonal mirror 33 shown in FIG. 2 is rotating, and when one semiconductor laser 59 is turned on, the laser beam emitted by the semiconductor laser 59 is reflected by the rotary polygonal mirror 33. Hence, as shown in FIG. 4N, the BD sensor 36 detects a BD signal (synchronization signal). The low-level period of the BD signal corresponds to one reflection surface of the rotary polygonal mirror, and control is made to write an image signal during that low-level period. The BD signal is output to the image processing system 69. Upon detecting the BD signal, the image processing system 69 changes the signal S/HASW to high level, as shown in FIG. 4F, and switches the contacts of the switch 76 to the b sides. Since the timing signals used are switched from the control signal generator 73 to the control signal generator 74, the signal S/HA-2

(sample low level) in FIG. 4C is supplied to the sample/hold circuit 62, and the signal APCA-2 in FIG. 4E is supplied to the switch 53.

A signal S/HA-2 changes to low level for a predetermined period of time in synchronism with the BD signal, as shown in FIG. 4C, thereby making the sample/hold circuit 62 sample during the low-level period. On the other hand, a signal APCA-2 consists of two-shot pulse signals which change to high level during the low-level period of the signal S/HA-2, as shown in FIG. 4E, and then change to high level after an elapse of a predetermined period of time. By supplying such timing signals indicating APC control and detection of the BD signal, the semiconductor laser 59 enters the APC control, i.e., it is turned on in a non-image region to do its APC control, as shown in FIG. 4H. In this manner, the semiconductor laser 59 enters the APC control synchronous with the BD signal, and lead-in of the APC control of the semiconductor laser 59 is complete. Of the two-shot pulse signals APCA-2, the second-shot pulse is used to turn on the semiconductor laser 59 to obtain the BD signal.

On the other hand, the image processing system 69 sets a signal STARTB at high level a predetermined period of time after the detection of the BD signal, as shown in FIG. 4I, thus turning on the switch circuit 72. Also, the image processing system 69 supplies a signal S/HB (sample low level) shown in FIG. 4J to the sample/hold circuit 65, and supplies a signal APCB (FIG. 4K) and signal DATA2 (FIG. 4L) to an adder 78. These signals are synchronized with the BD signal. The signals S/HB and S/HA-1 have different low-level timings, as a matter of course, and the signals APCB and DATA2 also have different high-level timings from that of the signal APCA-2. The signal DATA2 is supplied to set the semiconductor laser 60 nearly continuously ON.

By supplying these timing signals, since the sample/hold circuit 65 samples when the signal S/HB is at low level, and the switch 56 is turned off when the signals APCB and DATA2 are at high level, the semiconductor laser 60 is turned on during the OFF period of the switch 56. At this time, since the output signal of the current/voltage converter 61 is fed back, and the APC control is active, the light amount of the semiconductor laser 60 increases, as shown in FIG. 4M. The light amount of the semiconductor laser 60 also gradually increases due to the presence of the slow start circuit in the switch circuit 72.

When the light amount of the semiconductor laser 69 has reached a target value, the image processing system 69 sets the signal S/HB as a line control sample/hold signal at a timing different from that of the signal S/HA-2, as shown in FIG. 4J, and sets the signal DATA2 at low level, as shown in FIG. 4L. In this way, the semiconductor laser 60 enters the APC control having a timing different from the APC control period of the semiconductor laser 59, in synchronism with the BD signal, thus completing lead-in of the APC control of the semiconductor laser 60. With the above-mentioned operations, the apparatus is ready to print.

In summary, the image forming apparatus of the present invention, which comprises the plurality of laser light sources 59 and 60 for writing an image signal, and one photodiode 58 for detecting laser beams emitted by these laser light sources, and controls the light amounts of the individual laser light sources to desired light amounts on the basis of the output signal from the photodiode 58 by time-divisionally turning on the plurality of laser light sources in a non-image region, comprises means for leading in APC control of one of the plurality of laser light sources by turning on the one laser light source, the BD sensor 36 for detecting a synchronization signal from light obtained by scanning and reflecting a laser beam emitted by at least one of the plurality of laser light sources using the rotary polygonal mirror 33, and means for, when the synchronization signal is obtained, leading in APC control of the remaining one of the plurality of laser light sources by turning on the remaining light source in synchronism with the synchronization signal.

After lead-in of the APC control of the two semiconductor lasers 59 and 60 is complete, a write is made while executing the APC control of the two semiconductor lasers 59 and 60 in units of lines.

In the present invention, as shown in FIGS. 4A to 4N, detection of the synchronization signal, an optical write onto the image carrier, the APC control of the semiconductor laser 59, and the APC control of the semiconductor laser 60 are done during a period in which the laser beam is scanned by one reflection surface of the deflector.

In this way, since the plurality of laser light sources are time-divisionally turned on in units of scans to execute the APC control for controlling the light amounts of the individual laser light sources to desired light amounts on the basis of the output signal from the detection element, a stable multibeam write can be attained in units of scans.

An optical write method of the present invention comprises the step of scanning a laser beam emitted by at least one of the plurality of laser light sources by a deflector, and detecting a synchronization signal from the scanned laser beam, the step of scanning a laser beam emitted by at least one of the plurality of laser light sources by the deflector and making an optical write on an image carrier, the step of turning on a first laser light source as one of the plurality of laser light sources during a period in which neither detection of the synchronization signal nor optical write are in progress, and performing APC control of the first laser light source, and the step of turning on a second laser light source as the remaining one of the plurality of laser light sources after the APC control of the first laser light source is performed during the period in which neither detection of the synchronization signal nor optical write are in progress, and performing APC control of the second laser light source.

In an image forming apparatus of the present invention, which drives a plurality of laser light sources in accordance with an image signal, and makes an optical write on a photosensitive drum by scanning a plurality of laser beams modulated in correspondence with the image signal on the photosensitive drum using a deflector, a first laser light source as one of the plurality of laser light sources is turned on during a period in which neither detection of a synchronization signal from a laser beam scanned by the deflector nor optical write onto the photosensitive drum are in progress, so as to execute APC control of the first light source, and after the APC control of the first laser light source is done during the period in which neither detection of a synchronization signal from a laser beam scanned by the deflector nor optical write onto the photosensitive drum are in progress, a second laser light source as one of the remaining laser light sources is turned on to execute APC control of the second laser light source.

In the present invention, as shown in FIGS. 4A to 4N, detection of the synchronization signal, an optical write onto the image carrier, the APC control of the semiconductor laser 59 based on signals synchronized with the synchronization signal, and the APC control of the semiconductor laser 60 based on signals synchronized with the synchronization signal are done during a period in which the laser beam is scanned by one reflection surface of the deflector.

In this way, since the plurality of laser light sources are time-divisionally turned on based on the signals synchronized with the synchronization signal in units of scans to execute the APC control for controlling the light amounts of the individual laser light sources to desired light amounts on the basis of the output signal from the detection element, a stable multibeam write can be attained in units of scans.

An optical write method of the present invention comprises the step of scanning a laser beam emitted by at least one of the plurality of laser light sources by a deflector, and detecting a synchronization signal from the scanned laser beam, the step of scanning a laser beam emitted by at least one of the plurality of laser light sources by the deflector and making an optical write on an image carrier, the step of turning on a first laser light source as one of the plurality of laser light sources in synchronism with the synchronization signal, and performing APC control of the first laser light source, and the step of turning on a second laser light source as the remaining one of the plurality of laser light sources in synchronism with the synchronization signal after the APC control of the first laser light source is performed, and performing APC control of the second laser light source.

In an image forming apparatus of the present invention, which drives a plurality of laser light sources in accordance with an image signal, and makes an optical write on a photosensitive drum by scanning a plurality of laser beams modulated in correspondence with the image signal on the photosensitive drum using a deflector, a synchronization signal is detected from the laser beam scanned by the deflector, a first light source as one of the plurality of laser light sources is turned on in synchronism with the synchronization signal so as to execute APC control of the first laser light source, and after the APC control of the first laser light source is done, a second light source as one of the remaining laser light sources is turned on in synchronism with the synchronization signal to execute the APC control of the second laser light source.

In the above embodiment, an optical write is made using the two semiconductor lasers. Also, the present invention can be applied to a case using three or more semiconductor lasers. For example, when three semiconductor lasers are used, the processing up to lead-in of the APC control of the semiconductor lasers 59 and 60 is done in the same manner as in the above description, and when the light amount of the semiconductor laser 60 has reached a target value, lead-in of the APC control of the third semiconductor laser can be done in synchronism with the BD signal by the same method as that of the semiconductor laser 60. When four or more semiconductor lasers are used, lead-in of the APC control can be sequentially done in synchronism with the BD signal in such a manner that lead-in of the APC control of the next semiconductor laser is performed upon completion of that of the last semiconductor laser.

In the above embodiment, one of the two semiconductor lasers 59 and 60 is turned on, and the laser beam emitted by the ON semiconductor laser 59 is scanned by the deflector to detect the synchronization from the scanned laser beam. Alternatively, the two semiconductor lasers 59 and 60 may be simultaneously turned on to detect the synchronization signal.

Summarily, according to the present invention, the APC control is led in by turning on one of a plurality of laser light sources, and when a synchronization signal is detected from a light beam emitted by that ON laser light source, the remaining one of the plurality of laser light sources is turned on in synchronism with the obtained synchronization signal to execute the APC control of that laser light source. Hence, even when the APC control of a plurality of laser light sources is done using a single detection element, lead-in of the APC control of the plurality of laser light sources can be reliably attained, and an APC control lead-in method for a multibeam write method that makes an optical write using a plurality of light beams can be provided.

According to the present invention, since the plurality of laser light sources are time-divisionally turned on in units of scans to execute the APC control for controlling the light amounts of the individual laser light sources to desired light amounts on the basis of the output signal from the detection element, a stable multibeam write can be attained in units of scans.

What is claimed is:

1. An APC control lead-in method in an image forming apparatus having a plurality of laser light sources, comprising the steps:

scanning a laser beam emitted by at least one of said plurality of laser light sources by a deflector, and detecting a synchronization signal from the scanned laser beam;

turning on a first of said plurality of laser light sources and leading in APC control of said first laser light source; and turning on a second of said plurality of laser light sources in synchronism with the synchronization signal after lead-in of the APC control of said first laser light source is complete, and leading in APC control of said second laser light source.

2. A method according to claim 1, wherein lead-in of the APC control of said first and second light sources is done in a non-image region.

3. An optical write method in an image forming apparatus having a plurality of laser light sources, comprising the steps of:

scanning a laser beam emitted by at least one of said plurality of laser light sources by a deflector, and detecting a synchronization signal from the scanned laser beam;

scanning a laser beam emitted by at least one of said plurality of laser light sources by said deflector and making an optical write on an image carrier;

turning on a first of said plurality of laser light sources during a period in which neither detection of the synchronization signal nor optical write are in progress, and performing APC control of said first laser light source; and turning on a second of said plurality of laser light sources after the APC control of said first laser light source is performed during the period in which neither detection of the synchronization signal nor optical write are in progress, and performing APC control of said second laser light source.

4. An optical write method in an image forming apparatus having a plurality of laser light sources, comprising the steps of:

scanning a laser beam emitted by at least one of said plurality of laser light sources by a deflector, and detecting a synchronization signal from the scanned laser beam;

scanning a laser beam emitted by at least one of said plurality of laser light sources by said deflector and making an optical write on an image carrier;

turning on a first of said plurality of laser light sources in synchronism with the synchronization signal, and performing APC control of said first laser light source; and turning on a second of said plurality of laser light sources in synchronism with the synchronization signal after the APC control of said first laser light source is performed, and performing APC control of said second laser light source.

5. A method according to claim 4, wherein the APC control of said first and second laser light sources is done in a non-image region.

* * * * *

UNITED STATES PATENT AND TRADEMARK OFFICE
CERTIFICATE OF CORRECTION

PATENT NO.  : 5,965,869

DATED       : October 12, 1999

INVENTOR(S) : MICHIHARU MASUDA, ET AL.

It is certified that error appears in the above-identified patent and that said Letters Patent is hereby corrected as shown below:

<u>COLUMN 6</u>
  Line 35, "DATAL" should read --DATA1--.

<u>COLUMN 10</u>
  Line 9, "steps:" should read --steps of:--.

Signed and Sealed this

Nineteenth Day of September, 2000

Attest:

Q. TODD DICKINSON

*Attesting Officer*    *Director of Patents and Trademarks*